Figure 1:
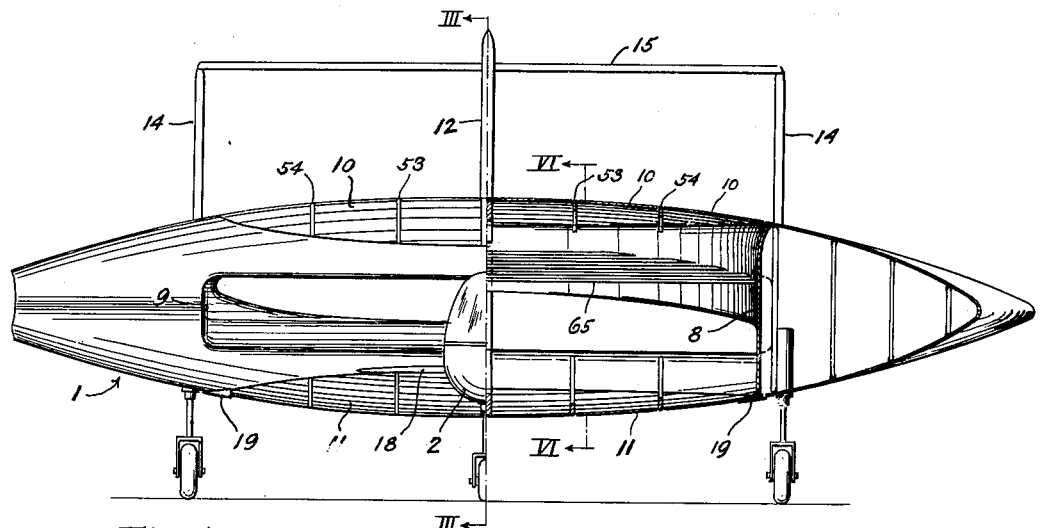

INVENTOR.
Robert S. Ross
BY
J. H. Oldham
ATTORNEY

Feb. 28, 1956  R. S. ROSS  2,736,514
CONVERTIBLE AIRCRAFT
Filed March 9, 1953  4 Sheets-Sheet 2

INVENTOR.
Robert S. Ross
BY
ATTORNEY

Feb. 28, 1956 R. S. ROSS 2,736,514
CONVERTIBLE AIRCRAFT
Filed March 9, 1953 4 Sheets-Sheet 3

INVENTOR.
Robert S. Ross
BY
*H. H. Oldham*
ATTORNEY

INVENTOR.
Robert S. Ross

United States Patent Office 2,736,514
Patented Feb. 28, 1956

2,736,514

CONVERTIBLE AIRCRAFT

Robert S. Ross, Warrensville Heights, Ohio, assignor to Goodyear Aircraft Corporation, Akron, Ohio, a corporation of Delaware Application March 9, 1953, Serial No. 340,957

5 Claims. (Cl. 244—15)

This invention relates to a heavier-than-air aircraft capable of flying horizontally at high speed as an airplane and also of rising and descending as a helicopter, as well as, of hovering, depending on the direction of the airflow passing through the aircraft body.

Heretofore, aircrafts intended for horizontal and vertical flight have been known in which the rotors are arranged horizontally within the aircraft body and in which the air enters the body at the top to be expelled at the rear to produce forward motion of the aircraft. However, the constructions shown in the prior art are not very favorable for obtaining high forward speed.

The general object of the invention is to provide an aircraft capable of high speed horizontal flight, vertical flight and having hovering characteristics.

Another object of the invention is to provide a convertible aircraft with effective control means for smoothly changing from horizontal flight to vertical and hovering flight.

Another object of the invention is to improve the forward speed of a convertible aircraft by applying boundary layer control over the aircraft body.

The aforesaid objects and other objects of the invention which will become apparent as the description proceeds are achieved by providing an air-foil-shaped aircraft body having top and bottom surfaces of substantially oval configuration with an interior airduct extending between the leading and trailing edges and with a vertical airduct between the top and bottom surfaces at their greatest distance from each other, including adjustable top and bottom louvers forming, when closed, portions of the body surfaces. A pair of counter-rotatable variable pitch rotors, with their vertical rotational axis tilted forwardly in fixed position relative to the aircraft and with their central plane of rotation passing substantially through the intersection of the center lines of the horizontal and vertical airducts, are attached to a motor as driving power for the aircraft. Whereas, in forward flight the aircraft is directionally controlled by conventional rudders, elevator, and ailerons, it is additionally equipped at the bottom opening with pairs of longitudinally and laterally spaced slidable covers for controlling and stabilizing the aircraft during vertical and hovering flight. Combined with the rudder control is a differential rotor pitch control to assist the rudder in its action, whereas, a separate pitch control is provided for changing the pitch of both rotors, in order to keep their speed substantially constant with the change of motor power.

Figure 2:
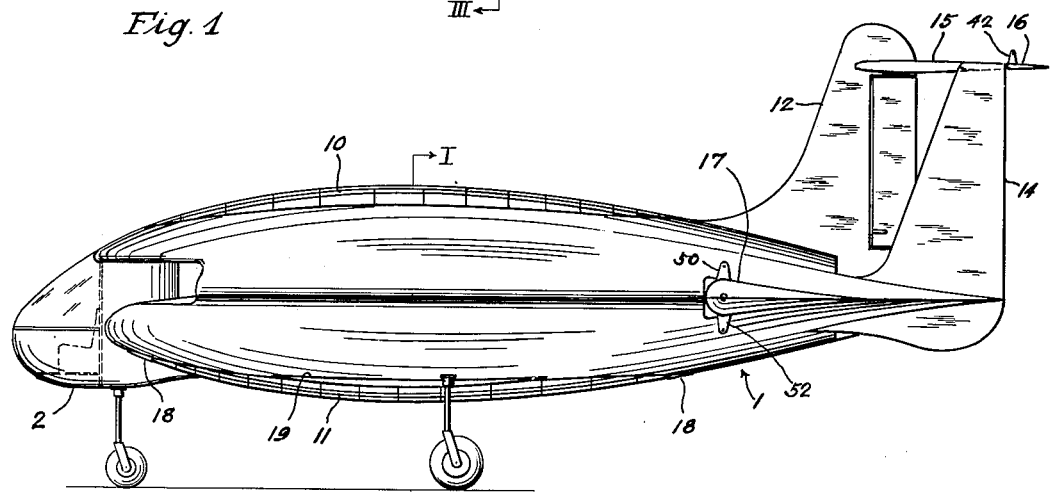
Figure 3:
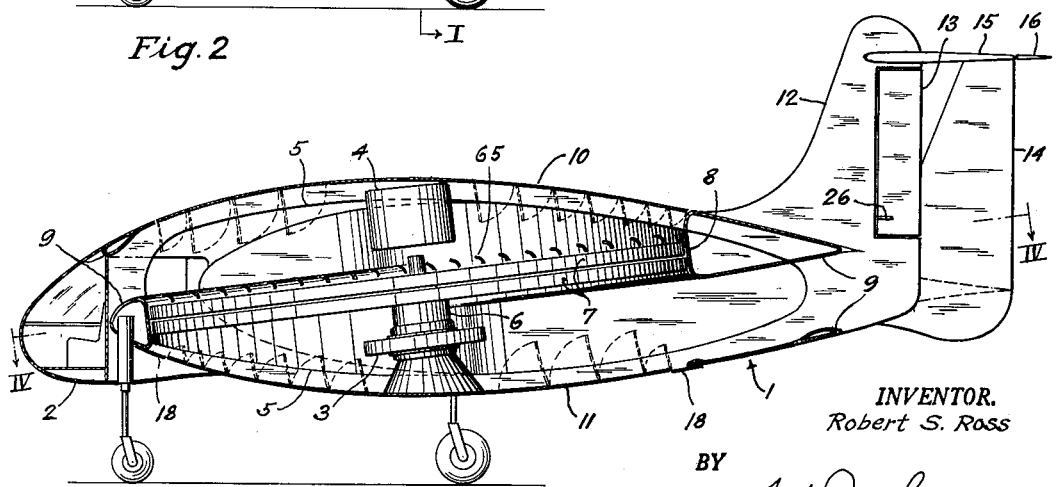
Figure 4:
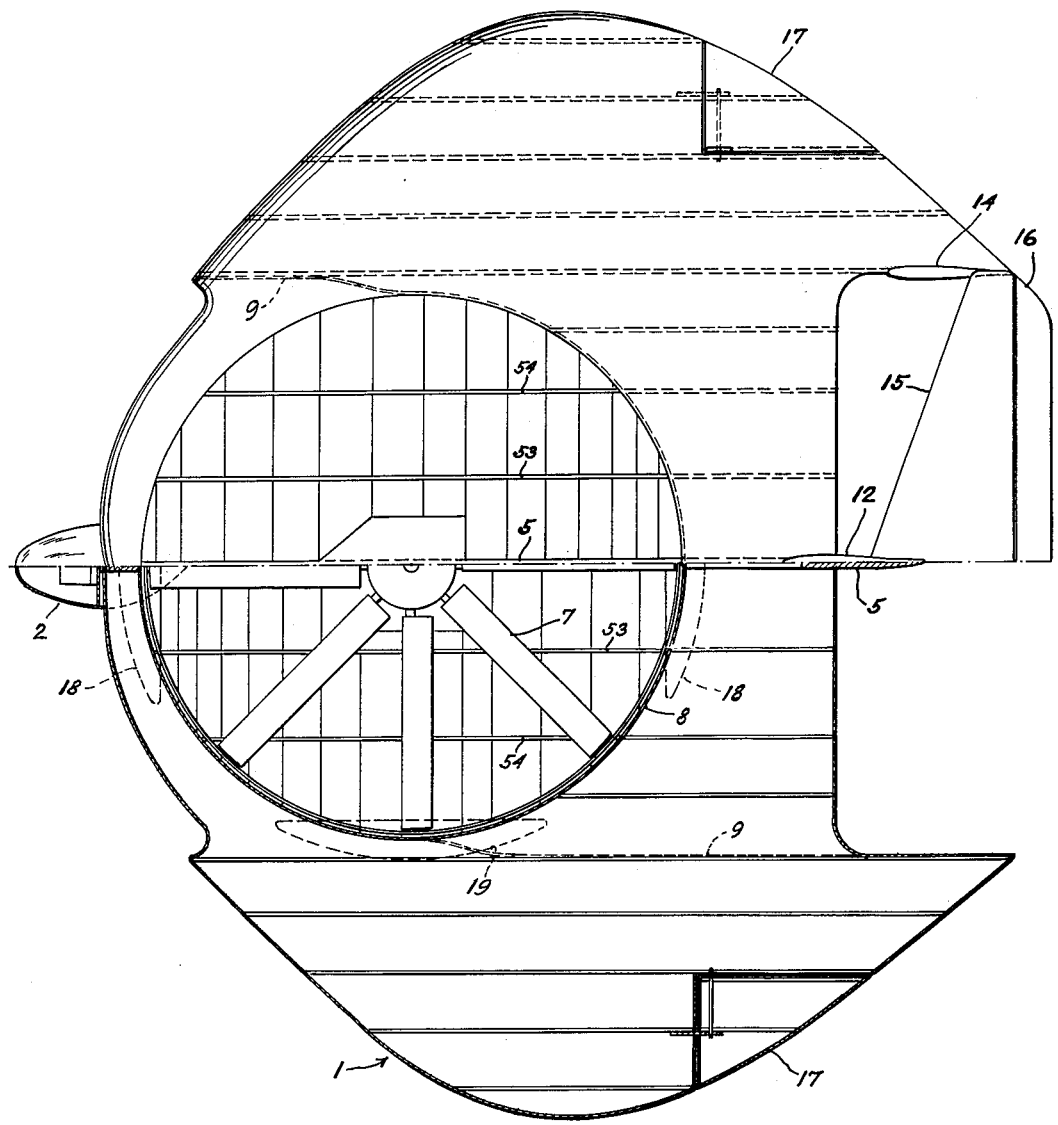
Figure 5:
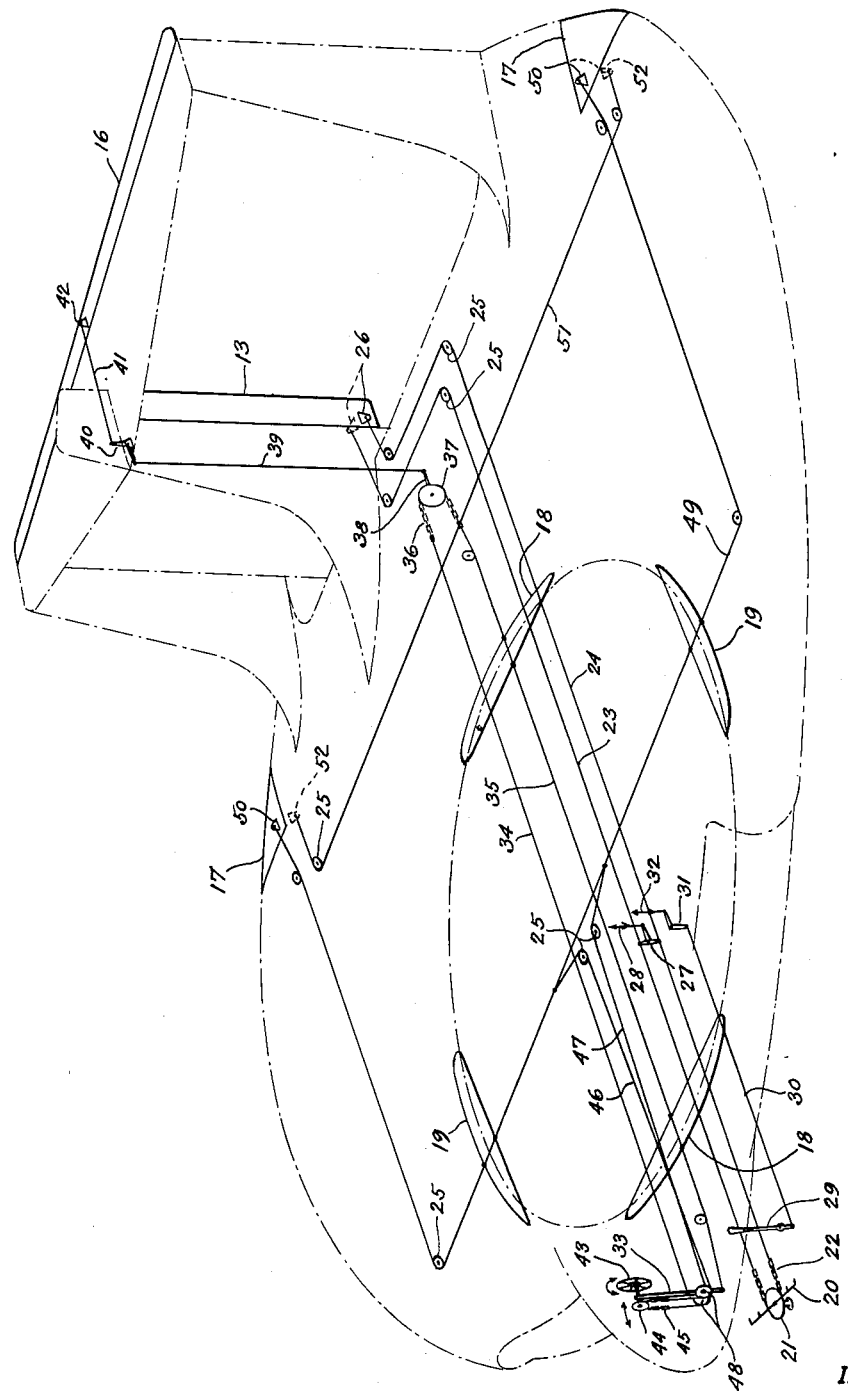
Figures 6, 7:
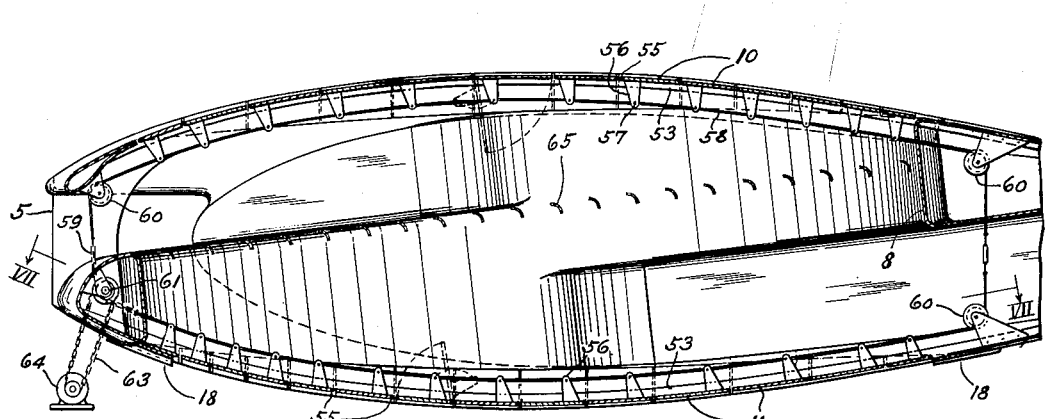

For a better understanding of the invention reference should be had to the accompanying drawings, wherein Fig. 1 is a one half front view of one embodiment of the invention, and the other half a cross-sectional view taken on line I—I of Fig. 2, Fig. 2 is a side view, Fig. 3 is a cross-sectional side view taken on line III—III of Fig. 1, Fig. 4 is a one half top plan view and the other half a transverse cross-sectional plan view taken on line IV—IV of Fig. 3, Fig. 5 is a perspective schematic view of the various directional controls of the aircraft, Fig. 6 is a longitudinal cross-sectional view through the louver system taken on line VI—VI of Fig. 1, and Fig. 7 is an inner plan view of the bottom louvers.

With specific reference to the form of the invention illustrated in the drawings, the numeral 1 indicates in general an aircraft body forming an airfoil which in plan view is of substantially oval configuration having its greatest width in transverse direction. This body, provided with a front cockpit 2, containing the controls for the aircraft, carries within a motor 3 and a fuel tank 4 mounted on the central longitudinal girder 5. The motor 3 has a substantially vertical approximately 7 degrees forwardly tilted axis about which is rotatable in opposite directions by means of a reversing gear 6 a pair of variable pitch rotors 7 closely surrounded by a well 8 having an enlarged curved air inlet to draw the air in sideways at high speed from the top surface of the body to increase the lift to the aircraft for vertical and hovering flight and lying in a longitudinal airduct 9 of substantially rectangular cross section which extends between the leading and the trailing edges of the body 1. In the well 8 are arranged transverse air guiding vanes 65 to properly direct the airflow into the rotors 7. Another air passage of circular shape, controllable by adjustable inwardly opening louvers 10 and 11 mounted, respectively, in the top and bottom body surfaces, leads axially through well 8.

For controlling forward flight of the aircraft are provided a vertical central fin 12 with a rudder 13 hinged thereto and a pair of vertical lateral fins 14 carrying a horizontal fin 15 to which is hinged the elevator 16, whereas the ailerons 17 form a portion of the aircraft body 1. On the other hand, for controlling and stabilizing the aircraft in vertical and in hovering flight, two pairs of slidable covers 18 and 19 of circular segmental shape and spaced from each other, respectively, longitudinally and laterally, are used by unsymmetrically covering the bottom louver opening. While employing the aircraft as an airplane, the louvers are closed and the rotors force the air coming in at front out at the rear, whereby, because of a most direct airflow and smooth outer body surfaces, the greatest possible speed is imparted to the aircraft. With the louvers open, the air has a substantially vertical flow with least resistance and thus operates the aircraft with great efficiency as a helicopter, whereas, with intermediate positions of the louvers hovering flight or various combinations of forward and vertical flight can be achieved.

As shown schematically in Fig. 5, the aircraft used as an airplane is laterally controlled by a conventional foot pedal 20 in association with a sprocket 21 in engagement with chain 22 connected by cables 23 and 24 running over pulleys 25 to opposite levers 26 attached to the rudder 13. To assist the rudder 13 in turning the aircraft a lever 27 operatively connected to the cables 23 and 24 moves up or down a push rod 28 engaging the variable pitch mechanism (not shown) of the rotors 7 to vary their pitch differentially to bring about a difference in rotor torques. In order to maintain substantially the same rotor speeds while changing the motor power, the pitch of both rotors is changed simultaneously by a hand lever 29 connected by a cable 30 with one arm of the lever 31, the other arm of which engages a spring-controlled push rod 32 movable in the rotor shaft to operate the variable pitch mechanism of the rotors.

The elevator 16 and the ailerons 17 are operated by a conventional control stick 33 which, when tilted about its horizontal axis, moves the cables 34 and 35 attached to a chain 36 engaging a sprocket 37 in association with a lever 38 connected by a linkage 39, 40 and 41 with the lever 42 extending from the elevator 16. Tied in with the cable 35 are also the slidable covers 18 at the bottom louver opening, which, however, are active only when the louvers are open, that is, when the aircraft operates as helicopter or is hovering.

The ailerons 17 are controlled by the stick handwheel 43 over a sprocket 44, a chain 45, cables 46 and 47 running over pulleys 48 and 25 and attached to a cable 49 fastened with its ends to the levers 50 of the ailerons and by a cable 51 connecting the levers 52 thereof. Also controlled by cable 49 is the movement of the pair of slidable covers 19 tied in therewith and having a similar function as the covers 18.

A separate control is provided for simultaneously operating the top louvers 10 and bottom louvers 11, as shown in Figs. 6 and 7. The louver blades 10 and 11, extending across their openings in sections between the main supporting central girder 5 and the lighter longitudinal girders 53 and 54, are swingable about hinges 55. In the free ends of each pair of adjacent levers 56 attached to the louver blades 10 and 11 are inserted connecting pivots 57 through which is needled and fixed therein an endless cable 58 including a chain 59 running respectively over pulleys 60 and sprockets 61 mounted on a shaft 62 which is operated by a chain drive 63 from an electric motor 64, instead of which, of course, any other suitable actuating device may be used.

From the aforesaid it appears obvious that the operation of an aircraft according to the invention is very simple and not different from that of a regular airplane and that changing the aircraft from an airplane into a helicopter is achieved smoothly by gradually changing the airflow through the aircraft by means of the louver system from a horizontal direction into a vertical direction. In leaving the louvers slightly open to form air slots, they will readily serve as boundary layer control without additional structure.

Having described one form of the invention using counter-rotatable rotors turning about the same axis, the rotors may be arranged side by side. Furthermore, the rotors could be of the self-rotating jet power type. Also the configuration of the aircraft body shown in the drawing may take on various shapes.

While certain representative embodiments and details have been shown for the purpose of illustrating the invention, it will be apparent to those skilled in the art that various changes and modifications may be made therein without departing from the spirit or scope of the invention.

What is claimed:

1. A propeller-driven convertible aircraft comprising a body having a top and a bottom surface forming together an airfoil of substantially lenticular transverse cross-section, said body being of substantially oval shape in plan view and of greater width than length and having its greatest height from the front at about one-third of its length, a front to rear air passage including a propeller well having a forwardly tilted fixed vertical axis, said air passage having a substantially rectangular cross-section of approximately the same width as the diameter of said well, adjustable inwardly foldable louvers supported in said body concentric with said well and flush with the top and bottom surfaces of the body for regulating the vertical air passage therethrough, a driving motor axially aligned with said well, a pair of counter-rotating variable pitch propellers driven by said motor and rotating within said well with their center plane passing substantially through the intersection of the motor axis and the longitudinal center axis of the body, an empennage including a rudder, an elevator, and ailerons, two pairs of segmental slidable covers for unsymmetrically changing the area of the opening for the bottom louvers, one pair being arranged transversely and the other pair longitudinally of the aircraft, control means linking together said transverse covers with said elevators for simultaneous operation and the longitudinal covers with said ailerons for simultaneous operation, and control means for simultaneous operation of said upper and lower louvers, the louvers being held in closed position for forward movement, in open position for vertical movement and in intermediate positions for combined horizontal and vertical movement of the aircraft.

2. In a propeller-driven aircraft a body having an open front to rear air passage and a round top to bottom air passage, the width and diameter, respectively, of said air passages being substantially equal to the propeller diameter, a propeller well located at the intersection of said air passages and having a forwardly tilted fixed axis, propeller means rotatable in said well about said axis, means for controlling the flow of air through said passages to provide forward and vertical flight or combinations thereof for the aircraft, an empennage including a rudder and an elevator, ailerons hinged rearwardly of and at both sides of the body, two pairs of segmental slidable covers for unsymmetrically changing the area of the bottom air passage, one pair being arranged transversely and the other pair longitudinally of the aircraft and control means linking together said transverse slides with said elevators for simultaneous operation and the longitudinal slides with said ailerons for simultaneous operation.

3. A propeller-driven convertible aircraft comprising an airfoil-shaped supporting body of greater width than length and transversely of substantially lenticular cross-section, including a front to rear air passage of substantially uniform width approximately equal to the propeller diameter and a round vertical air passage having a diameter substantially equal to that of the propeller, a propeller well having a vertical forwardly tilted fixed axis at the intersection of said air passages, a driving motor mounted within said body and in line with said axis, a pair of counter-rotating variable pitch propellers attached to said motor and surrounded by said well, adjustable inwardly-foldable louvers mounted flush with the top and bottom surfaces of the body and forming part thereof, and control means for simultaneously operating said louvers, said louvers being fully closed for forward motion, fully open for vertical motion, and in intermediate positions for combined forward and vertical motion of the aircraft.

4. In a propeller-driven aircraft a pair of counter-rotating propeller means, a body having an open front to rear air passage of wide, relatively flat shape and a round closable top to bottom air pasage, the width of the front to rear air passage being substantially equal to the diameter of the propeller means, the height of the front to rear air passage being at least equal to the combined height of the pair of propeller means, the diameter of the top to bottom air passage being slightly greater than the diameter of the propeller means, a propeller well having a forwardly tilted fixed axis at the intersection of said air passages, said pair of propeller means rotatable in said well about said axis and positioned one above the other, and means for controlling the flow of air through the respective passages to provide forward and vertical flight or combinations thereof for the aircraft.

5. In a propeller-driven aircraft, a body having an open front to rear air passage and a round top to bottom air passage, the width and diameter, respectively, of said air passages being substantially equal to the propeller diameter, a propeller well including transverse air guiding vanes, said propeller well being located at the intersection of said air passages and having a forwardly tilted fixed axis, propeller means rotatable in said well about said axis, and means for controlling the flow of air through said passages to provide forward and vertical flight or combinations thereof for the aircraft.

References Cited in the file of this patent

UNITED STATES PATENTS

| Number | Name | Date |
|---|---|---|
| 1,585,281 | Craddock | May 18, 1926 |
| 1,822,386 | Andersen | Sept. 8, 1931 |
| 2,377,835 | Weygers | June 5, 1945 |
| 2,461,435 | Neumann | Feb. 8, 1949 |
| 2,567,392 | Naught | Sept. 11, 1951 |